No. 650,153. Patented May 22, 1900.
C. McLEAR.
DENTAL TRAY.
(Application filed Oct. 20, 1899.)
(No Model.)

Witnesses:
Agnes A. Devine
Catharine Scanlon

Inventor:
Charles McLear
by Page & Durand
Attys

UNITED STATES PATENT OFFICE.

CHARLES McLEAR, OF CHICAGO, ILLINOIS, ASSIGNOR TO ALEXANDER I. WYATT AND ROSS C. GRAHAM, OF SAME PLACE.

DENTAL TRAY.

SPECIFICATION forming part of Letters Patent No. 650,153, dated May 22, 1900.

Application filed October 20, 1899. Serial No. 734,207. (No model.)

*To all whom it may concern:*

Be it known that I, CHARLES MCLEAR, a citizen of the United States, residing at Chicago, county of Cook, State of Illinois, have invented a certain new and useful Improvement in Dental Trays, of which the following is a specification.

My invention relates to trays or cups employed by dentists in taking plaster-of-paris impressions of the mouth.

The objects of my invention are to provide a light and inexpensive tray which can be thrown away after use, to provide a tray which is normally rigid, but which when saturated with moisture softens up and becomes pliable or yielding to an extent permitting it to be readily torn or stripped from the impression, to provide a tray composed of materials or substances which will not be objectionable or offensive to the patient, and to provide a cheap, clean, and practically non-breakable tray.

To the attainment of the foregoing and other useful ends my invention consists in matters hereinafter set forth and claimed.

Figure 1:
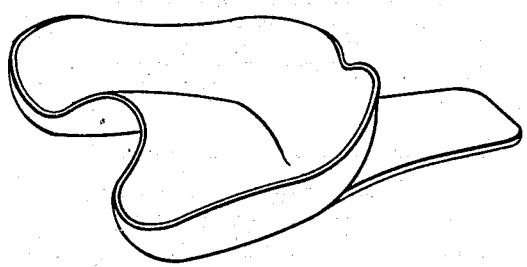
Figure 2:
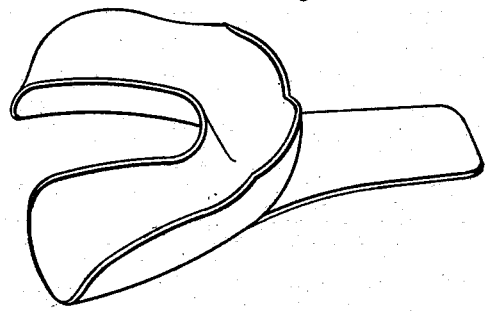
Figure 3:
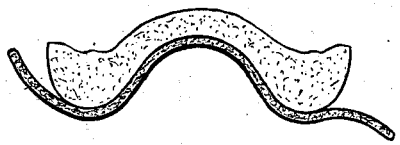
Figure 4:
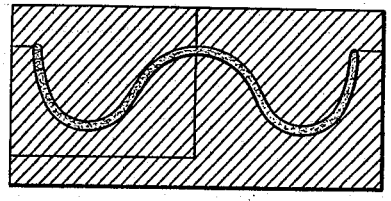

In the accompanying drawings, Figures 1 and 2 illustrate different forms of dental trays. Fig. 3 illustrates the manner in which my improved tray can be removed from the impression. Fig. 4 shows a tray and mold in cross-section.

My improved dental trays are preferably composed of rye-flour, asbestos fiber, and whiting. These ingredients are preferably mixed together in the proportion, by bulk or measure, of one part of flour to two parts of asbestos and four parts of whiting, and enough water is added to reduce the same to about the consistency of common bread-dough. This paste or dough is then placed within suitable molds, and the trays thus formed of various shapes are then placed within an oven and therein subjected to heat. The baking of the trays serves to dry and harden them and in this way to render them fit for service. This latter portion of the process may, however, be omitted, and instead the trays can be simply placed upon shelves or racks to dry. In molding the trays powdered soapstone is preferably employed, and by so doing the trays when finished have a sort of superficial coating of soapstone, which gives them a good finish and which, moreover, serves to some extent to prevent adhesion between the tray and impression. Wheat-flour or its obvious equivalents may be employed in place of rye-flour, if so desired, and pipe-clay, Spanish white, or other like substances may be employed in place of whiting. The rye-flour serves as a sort of sizing and gives the composition a semiviscous or glutinous character. To the whiting is due the absorbent property of the mixture, and the asbestos fiber, which is best adapted for this purpose, as it is not affected by heat, serves to strengthen the trays and, as previously stated, to render them practically non-breakable.

In use the tray is loaded or filled with the plaster-of-paris or other substance with which the impression is to be obtained, and such impression is then made in the usual and well-known manner. The tray absorbs moisture from the plaster-of-paris and by so doing hastens the setting of the latter. The moisture thus taken up by the tray renders it comparatively soft and pliable or yielding, and it can then be readily stripped or peeled from the impression, as shown in Fig. 3, and then thrown away. In this way each patient can be operated upon with clean and unused trays, and the advantages of so doing, from a sanitary point of view, are of course obvious.

Dental trays thus made are, it will be seen, of a soluble or semisoluble character and can be altered in form by first soaking them until they become soft and flexible and then bending them into the desired shapes and permitting them to dry and become hard again.

What I claim as my invention is—

1. A dental tray composed of rye-flour, asbestos fiber and whiting.

2. A dental tray composed of rye-flour, asbestos fiber and whiting; said ingredients being mixed in the proportion by measure of one part of flour, two parts of asbestos and four parts of whiting.

CHARLES McLEAR.

Witnesses:
ALEXANDER I. WYATT,
A. F. DURAND.